Oct. 16, 1962
J. A. HUBENY
3,058,741
CLAMPING AND HOLDING MACHINE
Filed March 16, 1960
3 Sheets-Sheet 1
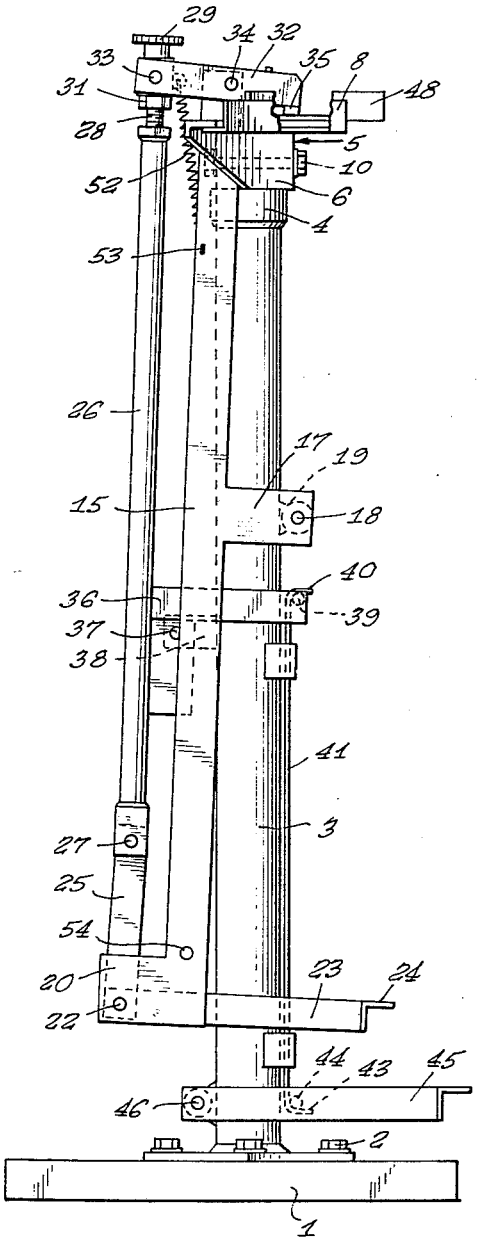
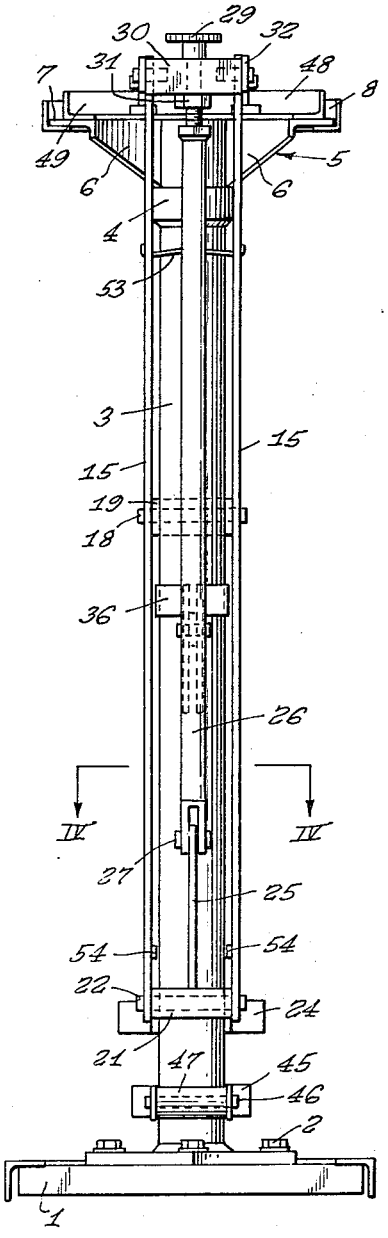
Inventor
Jerry A. Hubeny Oct. 16, 1962 J. A. HUBENY 3,058,741
CLAMPING AND HOLDING MACHINE
Filed March 16, 1960

Inventor
Jerry A. Hubeny

Oct. 16, 1962  J. A. HUBENY  3,058,741
CLAMPING AND HOLDING MACHINE
Filed March 16, 1960  3 Sheets-Sheet 3
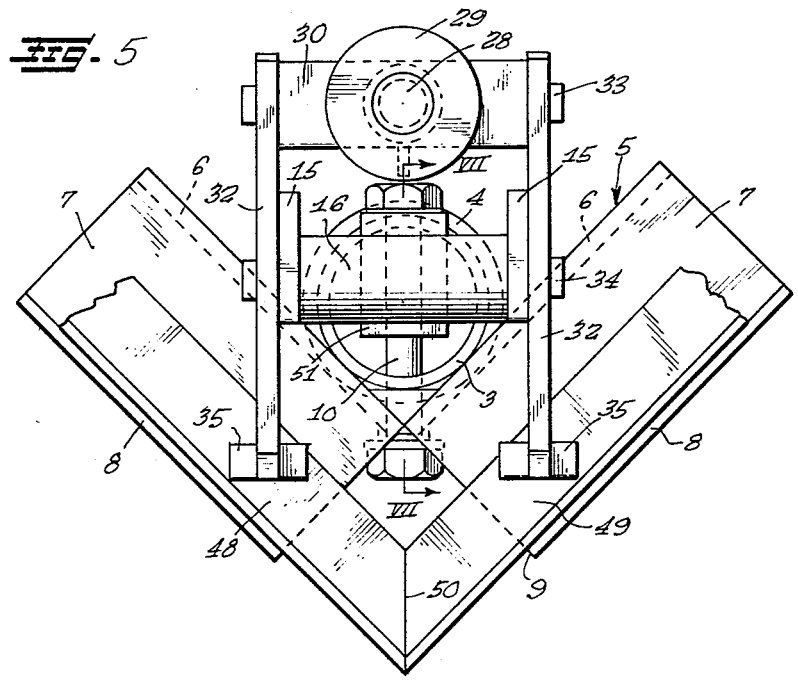
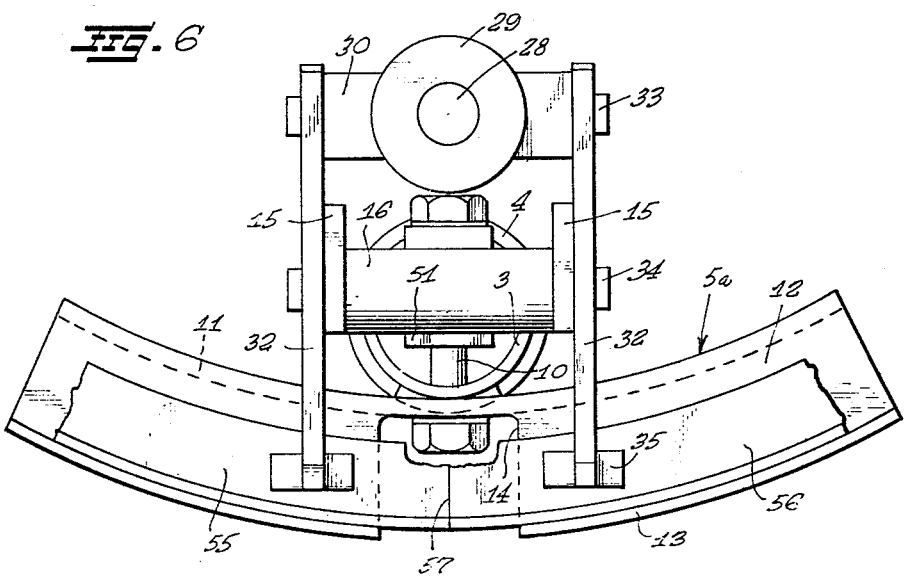
Inventor
Jerry A. Hubeny

United States Patent Office 3,058,741
Patented Oct. 16, 1962

3,058,741
CLAMPING AND HOLDING MACHINE
Jerry A. Hubeny, 2229 S. Elmwood, Berwyn, Ill.
Filed Mar. 16, 1960, Ser. No. 15,303
9 Claims. (Cl. 269—153)

This invention relates to improvements in a clamping and holding machine, and more particularly to a machine for accurately and positively holding separate parts in confronting or abutting relationship in a manner leaving the hands of the operator free to join the held parts together in a permanent manner, although the machine may have other uses and purposes as will be apparent to one skilled in the art.

In the past, considerable difficulty has been experienced in properly holding a pair of members in confronting or abutting relationship while the members were secured end to end by soldering, brazing, welding, or in an equivalent manner. This was especially true when the two members had to be accurately secured together such as when a frame is made and the adjacent ends of the members must abut with precision and exact evenness so the resultant frame will have the requisite fit and appearance, particularly at the corners. The difficulty was greatly increased especially where the pieces were of material length, were curved, angular in cross-section, and had their ends cut off at an angle. For example, brass angle members are frequently used to make the frame for an inlaid mosaic table top or the like, and the frame members would have their ends cut off at approximately 45°, and these frame members had to be accurately connected end to end in order to properly contain the cement and tile pieces and give the resultant pleasing appearance.

While endeavors have been made in the past to provide a suitable clamping and holding mechanism for such purposes, previously known attempts have resulted in objectionable apparatus in that the operator's hands were not free to set the pieces accurately on the holding mechanism and then secure them in position by a simple foot pedal operation, thereafter leaving the operator's hands entirely free for the purpose of joining workpieces together. Also, formerly known apparatus was not readily adjustable to accommodate workpieces of various sizes and shapes, and in many cases the securement of the pieces during their joining was not as positive as is desired. Further, in formerly known apparatus workpieces were not as easily mounted and removed as is desirable for economy of manufacture.

With the foregoing in mind, it is an important object of the instant invention to provide a simple form of clamping machine capable of quickly gripping and positively holding workpieces in relative positions of adjustment, and which is substantially instantly releasable to free the workpieces when desired.

Also an object of this invention is the provision of a simple form of clamping and holding machine in which workpieces may be secured in position by simple foot pedal operation, equally as easily released, and during the holding of the workpieces, both hands of the operator are free for connecting the workpieces together.

It is also a feature of this invention to provide a clamping and holding machine embodying clamping jaws which move outwardly and downwardly to engage the workpieces, and which move upwardly and inwardly to release the workpieces and leave them free to be lifted vertically from the machine without interference from any parts of the mechanism.

Still another object of this invention is the provision of a simple form of clamping machine that is readily adjustable to compensate for various sizes, shapes, and thicknesses of workpieces.

It is also a desideratum of this invention to provide a clamping machine having a simple form of overcenter toggle holding means which are instantly releasable and in which the clamping jaws automatically move entirely away from the work holding area.

While some of the more salient features, characteristics and advantages of the instant invention have been above pointed out, others will become apparent from the following disclosures, taken in conjunction with the accompanying drawings, in which:

FIGURE 1 is a side elevational view of a machine embodying principles of the instant invention, showing the same in clamping position, and with parts broken away for clarity;

FIGURE 2 is a rear elevation of the structure of FIGURE 1, taken from the left-hand side of FIGURE 1;

FIGURE 5 is an enlarged top plan view of the structure of FIGURE 1, taken from the right-hand side of FIGURE 1;

FIGURE 6 is a view similar in character to FIGURE 5, but showing a work holding head of different shape to accommodate curved workpieces.

As shown on the drawings:

Figure 3:
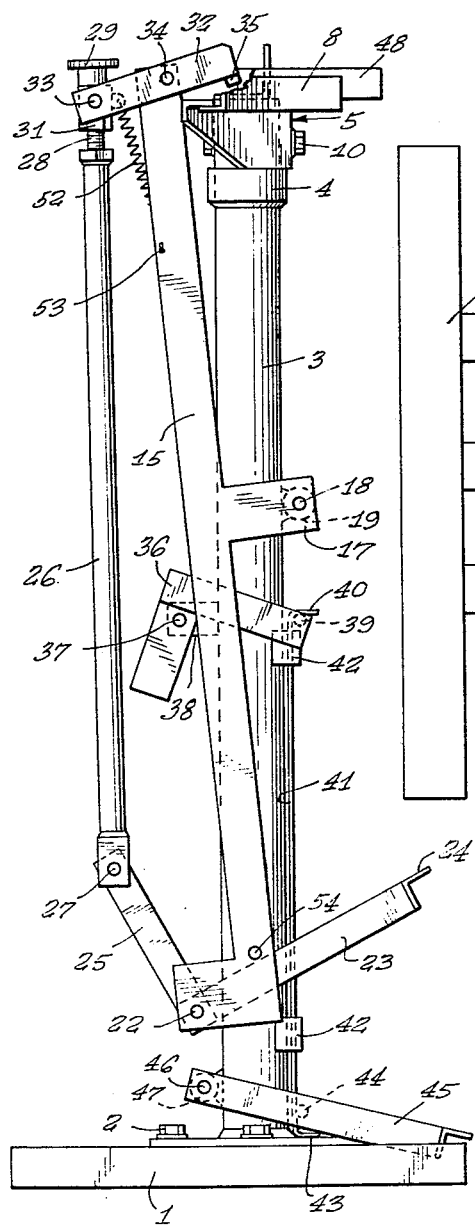
FIGURE 3 is a view similar in character to FIGURE 1, but showing the mechanism in released position.

The illustrated embodiment of the instant invention includes a suitable base structure 1 on which is secured, as by bolts 2 for example, an upright support 3 which may satisfactorily be in the form of a metallic pipe. Welded or equivalently secured to the upright 3 near the top thereof is a collar 4 to act as a supporting rest for a work holding head, generally indicated by numeral 5.

Figure 7:
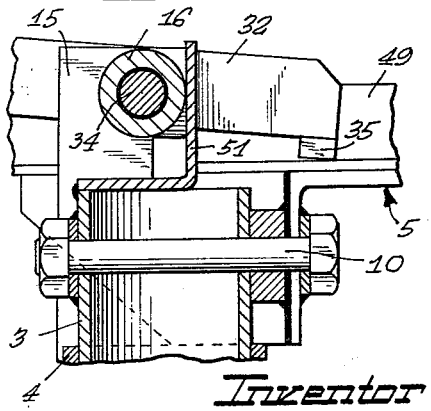
FIGURE 7 is a fragmentary vertical sectional view taken substantially as indicated by the line VII—VII of FIGURE 5.

The work holding head is of a shape consistent with the intended relative disposition and character of the workpieces to be united. For holding workpieces with their ends cut off at a 45° angle at right angles to each other with the ends abutting, a supporting head 5 of the character seen particularly in FIGURE 5 is preferably utilized. This head is preferably fabricated so as to provide a pair of depending flanges 6—6 at right angles to each other, which rest upon the aforesaid collar 4 when the head is mounted in position. Any suitable structure may be utilized to provide a pair of flat faces 7—7 each having an upstanding flange 8 along its outer edge. The flat faces 7—7 function as rests for the work which is also disposed against the flanges 8—8 to be firmly held in position by clamping means to be later described. As seen particularly in FIGURE 5, the faces 7—7 with their flanges 8—8 are disposed at right angles to each other with the inside corners of the faces in abutment and a space 9 left between the ends of the faces so that the work may freely project into the open and be accessible to the operator. As seen best in FIGURE 7, the work holding head 5 is secured to the upper end of the support 3 by a bolt and nut assembly 10 which is easily manipulated to remove and replace heads.

In FIGURE 6 I have illustrated a different form of work holding head, generally indicated by numeral 5a, and by way of example only, I have selected a work holding head designed to receive arcuate work pieces. In this instance, the head includes preferably a single member having a depending flange 11, a flat work receiving face 12, and an upstanding flange 13 at the outer edge of the work receiving face. The head itself is arcuate, as clearly seen in FIGURE 6, and in order to expose the ends of the work pieces, a notch 14 is provided through the upstanding flange 13 and the flat portion 12. The work receiving head 5a is mounted in position on the support 3 in the same manner as above described. It will therefore be apparent that work receiving heads of various shapes are quickly interchangeable, depending upon the character and shape of the work pieces acted upon.

Figure 4:
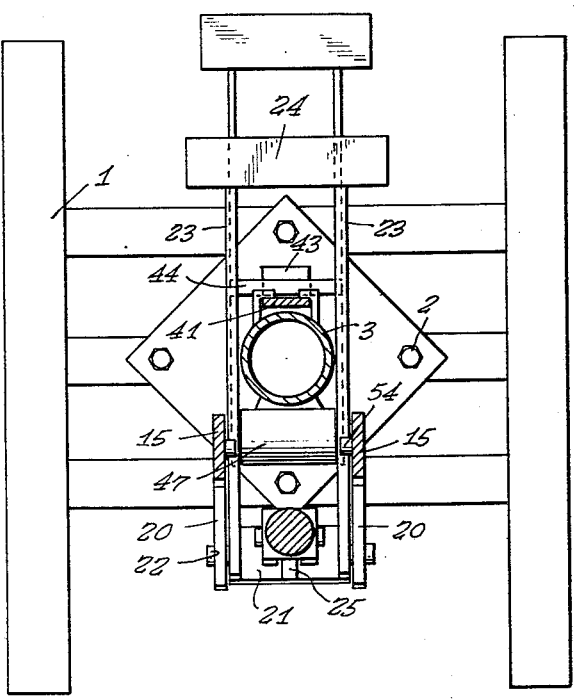
FIGURE 4 is an enlarged plan sectional view taken substantially as indicated by the line IV—IV of FIGURE 2, looking in the direction of the arrows.

The clamping mechanism includes a pair of like elongated arms 15—15 extending upwardly one on each side of the support 3. These arms are connected at the top above the support 3 by means of a spacer sleeve 16 seen in FIGURES 5 and 7. The arms are also connected intermediately of their length by way of a pair of laterally extending ears 17 through which a pivot pin 18 extends, this pin also passing through a boss 19 secured to the support 3. At the bottom each arm is provided with a laterally extending ear 20 in the opposite direction from the ear 17, between which ears is a spacer sleeve 21 (FIGURES 2 and 4) in which a pen 22 is fixed. A treadle is provided for actuating the main arms 15—15. This treadle comprises a pair of arms 23—23 extending on each side of the upright 3, which arms are also fixed to the sleeve 21 and pin 22 on one side of the upright 3, and which are cross connected by a foot plate 24 on the opposite side of the upright 3.

For locking the device in clamping position, an overcenter toggle linkage assembly is provided which includes a lower link 25 secured to the aforesaid sleeve 21 to form a bell-crank with the arms 23—23, and an upper link 26 pivoted as at 27 to the upper end of the lower link, the ears 20—20 pivoting on the projecting ends of the pin 22 outside the bell-crank assembly. At the upper end thereof, the link 26, which may also be satisfactorily in the form of a pipe, is internally threaded to accommodate a bolt 28 having a hand wheel 29 secured thereto. This bolt 28 has a smooth shank portion extending through a spacer sleeve 30 in which the bolt is freely rotatable, and beneath the spacer sleeve 30 a lock nut 31 is preferably provided. Obviously, rotation of the hand wheel 29 moves the bolt 28 into or out of the upper end of the toggle link 26 and thereby effects a lengthening or shortening of that link to provide adjustment for the clamping means now about to be described.

The clamping elements embody a pair of spaced clamping jaws or fingers 32—32 pivotally connected to the aforesaid spacer sleeve 30 by means of a pivot pin 33. These jaws are also pivotally connected to the upper ends of the main lever arms 15—15 by a pivot pin 34, as seen best in FIGURE 5. The free ends of the FIGURES or jaws 32 are each provided with a foot or clamping shoe 35 to bear directly against a work piece.

Quick release means are provided for the clamping machine, and these release means embody a bell-crank assembly 36 pivoted at 37 to a boss 38 secured on the support 3. The forward end of the bellcrank 36 carries a transverse pin 39 over which the bent end 40 of a link 41 extends. This link is slidable relatively to the support 3 in spaced stirrups 42—42 secured to the support. The lower end of the link is also outwardly bent as indicated at 43 and underlies a cross pin 44 carried by a U-shaped treadle 45 pivoted as at 46 to a boss 47 secured to the lower end of the support 3.

In operation, the instant invention is extremely simple and positive. Assuming that it is desired to connect a pair of angle members having their ends cut at 45°, in order to form a corner of a frame or the like, it is simply necessary to place such members 48 and 49, as seen best in FIGURE 5, on the flat faces 7—7 with their upstanding flanges contacting the flanges 8—8 of the work supporting head 5. At this time, of course, the clamping means are in the released position seen in FIGURE 3, and there is nothing overhanging the head 5, so that the operator's hands are both free to easily position the work pieces 48 and 49 on the head with the ends of the work pieces in exact abutment with each other as indicated at 50. The operator then steps on the foot plate 24 causing the arms 15 to swing forwardly at their upper ends, and causing the toggle links 25 and 26 to assume substantially a vertical position, but slightly overcenter, that is the pivot pin 27 is slightly to the right of a straight line connecting the centers of pins 22 and 33 as viewed in FIGURE 1. This overcenter disposition of the toggle links effectively locks the clamping jaws 32—32 on the work in the position seen in FIGURE 5. As the toggle links assume locking position and as the arms 15—15 move forwardly at their upper ends, the clamping jaws are carried forwardly and downwardly so that the shoes 35—35 firmly hold the work pieces 48 and 49. The operator's hands are again free to unite the ends of the work pieces as by soldering, brazing, welding, or in any other desired manner. The joint may be finished without disturbing the work pieces, since the ends of these work pieces are freely exposed at the opening 9 in the supporting head. As the clamping jaws move forwardly and downwardly, the spacer sleeve 16 between the upper ends of the arms 15—15 bears against an angular stop 51 secured to the upper end of the support 3, thus limiting the forward movement of the jaws and causing them to come downward into firm and positive contact with the work pieces.

After the joint between the work pieces has been established, and polished or smoothed if so desired, it is a simple expedient for the operator to release the work pieces by merely stepping upon the treadle 45. Through the link 41, this treadle pivots the bellcrank assembly 36 so that the lower end of this assembly forces the toggle link 26 inwardly past center position, causing the mechanism to assume the released position seen in FIGURE 3. This movement of the mechanism toward released position is materially aided by means of a tension spring 52 secured at one end to the spacer sleeve 30 between the inner ends of the clamping jaws, and at the other end to the arms 15—15 by a cross connection 53. The mechanism is prevented from moving too far in released position by means of a pair of stop pins 54—54 on the lower ends of the arms 15—15 being contacted by the arms 23 on the locking treadle. The foot plate 24 is thereby maintained in readily accessible position for repeating the operation. It will be especially noted that when the mechanism is in released position, the clamping jaws have moved upwardly and inwardly so they do not overlie any portion of the work pieces, and these work pieces may be lifted straight up off the head 5 for easy removal. It will also be noted that where a plurality of clamping machines are utilized centrally of a complete frame, with one machine operating on the work pieces adjacent each corner of that frame, the entire frame may be completely assembled and readily removed upon release of the clamping machines.

With the arcuate work receiving head 5a shown in FIGURE 6, a pair of arcuate work pieces 55 and 56 may be placed in position, held by the clamping means in the manner above described, and joined together at 57 at their abutting ends. The mechanism operates in identically the same way for substantially any type or shape of head.

Various thicknesses of work pieces may be compensated for by actuation of the hand wheel 29 which lessens or increases the grip of the clamping jaws on the work pieces.

From the foregoing, it is apparent that I have provided a simple form of clamping and holding mechanism which leaves the hands of the operator free before and after the clamping operation, and which is instantly releasable with the clamping jaws moving entirely away from the work. The device is durable, and economical to manufacture and use.

It will be understood that modifications and variations may be effected without departing from the scope of the novel concepts of the present invention.

I claim as my invention:

1. In a machine for clamping a pair of members and holding them in a position of relative adjustment, an upright support, work receiving means on said support, an upright arm pivoted intermediately to said support, a clamping finger pivotally connected to the upper end of said arm, a pair of toggle links pivoted together and the end of one link pivoted to an end of said finger, a foot pedal, forming a bell-crank with the lower end of the other link, the lower end of said arm and said foot pedal being pivotally connected whereby said foot pedal may be pressed to force said links to an overcenter position causing said finger to clamp work against said work receiving means all in a single operation, and means to force said links oppositely to free position to release said finger.

2. In a machine for clamping a pair of members and holding them in a position of relative adjustment, supporting means, work receiving means thereon, a clamping finger to hold a work piece against said receiving means, swingable means carrying and pivotally connected to said finger, pivotally connected toggle links, means pivotally connecting one of said links to said finger, a pivotal connection between the other link and said swingable means, means to force said links into an overcenter holding position to cause said finger to clamp work against said work receiving means, and means to force said links oppositely to a free position to release said finger.

3. In a machine for clamping and holding a pair of work pieces in a position of relative adjustment, a support, a work receiving head on said support, a pair of clamping jaws to cooperate with said support and hold work pieces thereon against movement, overcenter toggle means to move said jaws in unison and lock the same in clamping position in a single operation, a treadle to actuate said toggle means, and separate treadle actuated means to move said toggle means and clamping jaws to released position.

4. In a machine for clamping and holding work pieces in a position of relative adjustment, supporting means, a work receiving head on said means, clamping means bodily swingable over and pivotal downwardly towards said head to clamp work pieces therebetween against movement, treadle actuated means to move said clamping means to clamping position in a single operation, and separate treadle actuated means to release said clamping means.

5. In a machine for clamping and holding work pieces in a position of relative adjustment, supporting means, a work receiving head on said means, clamping means bodily swingable over and pivotal downwardly towards said head to clamp work pieces therebetween against movement, treadle actuated means to move said clamping means to clamping position in a single operation, and separate treadle actuated means to release said clamping means, said clamping means being disposed inwardly of said head when in released position leaving the space above said head entirely unobstructed.

6. In a machine for clamping and holding work pieces in a position of relative adjustment, supporting means, a work receiving and supporting head on said means having a work supporting upper face, said head having a permanent opening therein to provide access to abutting ends of work pieces, clamping means movable toward said head and pivotal downwardly to grip work pieces on each side of said opening, and treadle means to actuate said clamping means into and away from clamping position.

7. In a machine for clamping work pieces in a position of relative adjustment, a support, a work receiving and supporting head removably mounted on said support, clamping means movable bodily over and pivotal downwardly with respect to said head to hold work pieces thereon, and separate control means to operate said clamping means toward and away from said head, said clamping means moving off and laterally with respect to said head when released to permit free removal and interchanging of heads.

8. In a machine for clamping work pieces in a position of relative adjustment, a support, a work receiving head on said support, an arm pivoted to said support, a pair of toggle links piovted together and the end of one link pivoted to said arm, clamping means pivoted to the other of said links and to said arm, treadle means to move said arm and links to bring said clamping means into work holding association with said head, said toggle links assuming an overcenter relation to lock the clamping means in work holding position, and separate treadle means operable to release said toggle means to move the clamping means into released position and laterally away from said head.

9. In a machine for clamping a pair of members and holding them fixedly in a position of relative adjustment, an upright support, a work holding head on said support, a pair of arms disposed one on each side of said support each of which is pivoted at an intermediate point to said support and both of which are connected above said head, a pair of clamping fingers one pivoted intermediately to the top of each said arm, a holding shoe on one end of each said finger, a link generally paralleling said support and pivoted at its upper end to the other ends of said fingers, a bell-crank having an upright leg pivoted to the lower end of said link, a foot pedal on the other end of said bell-crank, a pivotal connection between said arms and said bell-crank whereby said pedal may be actuated to move said fingers into work holding position and lock them in such position by forcing said link and upright bell-crank leg into an overcenter position in a single operation, and other foot pedal means to release said fingers.

References Cited in the file of this patent

UNITED STATES PATENTS

| | | |
|---|---|---|
| 438,104 | Folsom | Oct. 7, 1890 |
| 1,421,065 | Callan | June 27, 1922 |
| 1,848,527 | Hickey | Mar. 8, 1932 |
| 2,417,503 | Kelly | Mar. 18, 1947 |
| 2,498,725 | Thornburg | Feb. 28, 1950 |